United States Patent
Boloorchi et al.

(10) Patent No.: US 6,942,057 B2
(45) Date of Patent: Sep. 13, 2005

(54) FEEL CONTROL FOR ACTIVE STEERING

(75) Inventors: Farhad Boloorchi, Novi, MI (US); John D. Martens, New Hudson, MI (US); Karen A. Boswell, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 256 days.

(21) Appl. No.: 09/990,741

(22) Filed: Nov. 21, 2001

(65) Prior Publication Data

US 2003/0094330 A1 May 22, 2003

(51) Int. Cl.[7] .................................................. B62D 5/04
(52) U.S. Cl. ........................ 180/446; 701/42; 318/432
(58) Field of Search .............................. 180/402, 403, 180/443–446, 421, 422; 318/432, 433, 488, 489, 621, 632; 701/41–43

(56) References Cited

U.S. PATENT DOCUMENTS

| | | | | |
|---|---|---|---|---|
| 3,765,624 A | * | 10/1973 | Kaniuka ..................... 244/227 |
| 4,078,749 A | * | 3/1978 | Johnson, Jr. ................ 244/178 |
| 4,576,056 A | * | 3/1986 | Barthelemy ................ 180/444 |
| 4,676,331 A | * | 6/1987 | Iwaki et al. ................ 180/443 |
| 4,708,220 A | | 11/1987 | Noto et al. |
| 4,715,462 A | * | 12/1987 | Taig .......................... 180/444 |
| 4,724,917 A | * | 2/1988 | Naito et al. ................ 180/404 |
| 4,765,425 A | * | 8/1988 | Saito et al. ................ 180/444 |
| 4,802,543 A | | 2/1989 | Ishikura et al. |
| 4,951,199 A | | 8/1990 | Whitehead ............. 364/424.05 |
| 5,205,371 A | | 4/1993 | Karnopp .................... 180/79.1 |
| 5,265,019 A | | 11/1993 | Harara et al. .......... 364/424.05 |
| 5,322,308 A | * | 6/1994 | Bishop ...................... 180/414 |
| 5,347,204 A | * | 9/1994 | Gregory et al. ............ 318/632 |
| 5,504,403 A | * | 4/1996 | McLaughlin ............... 318/432 |
| 5,511,629 A | * | 4/1996 | Vogel ........................ 180/447 |
| 5,704,446 A | * | 1/1998 | Chandy et al. ............. 180/446 |
| 5,719,766 A | | 2/1998 | Bolourchi et al. ..... 364/424.052 |
| 5,732,373 A | | 3/1998 | Endo |
| 5,736,822 A | * | 4/1998 | Mitarai et al. ............. 318/116 |
| 5,796,231 A | * | 8/1998 | Kyodo ....................... 318/608 |
| 5,859,774 A | * | 1/1999 | Kuzuya et al. ............. 180/197 |
| 5,973,468 A | * | 10/1999 | Yamauchi ................... 318/610 |
| 6,039,143 A | * | 3/2000 | Kielar et al. ................ 180/253 |
| 6,085,860 A | | 7/2000 | Hackl et al. ................ 180/443 |
| 6,107,767 A | * | 8/2000 | Lu et al. ..................... 318/561 |
| 6,122,579 A | * | 9/2000 | Collier-Hallman et al. . 180/234 |
| 6,148,948 A | * | 11/2000 | Shimizu et al. ............. 180/446 |
| 6,176,341 B1 | * | 1/2001 | Ansari ........................ 180/402 |
| 6,226,579 B1 | | 5/2001 | Hackl et al. .................. 701/41 |
| 6,246,197 B1 | * | 6/2001 | Kurishige et al. .......... 180/443 |
| 6,263,997 B1 | * | 7/2001 | Breuning et al. ........... 180/402 |
| 6,325,333 B1 | * | 12/2001 | Najmabadi et al. ......... 244/181 |
| 6,370,459 B1 | * | 4/2002 | Phillips ...................... 180/443 |
| 6,370,460 B1 | * | 4/2002 | Kaufmann et al. ........... 701/41 |
| 6,381,526 B1 | * | 4/2002 | Higashi et al. ............. 180/443 |
| 6,407,524 B1 | * | 6/2002 | Endo et al. ................. 318/432 |
| 6,422,335 B1 | * | 7/2002 | Miller ........................ 180/446 |
| 6,450,287 B1 | * | 9/2002 | Kurishige et al. .......... 180/443 |
| 6,453,226 B1 | | 9/2002 | Hac et al. |
| 6,496,762 B2 | * | 12/2002 | Kurishige et al. ............ 701/41 |
| 6,499,559 B2 | * | 12/2002 | McCann et al. ............. 180/446 |
| 6,575,265 B2 | * | 6/2003 | Richardson et al. ........ 180/444 |
| 6,591,937 B2 | | 7/2003 | Badenoch et al. |
| 6,625,530 B1 | * | 9/2003 | Bolourchi .................... 701/42 |
| 2001/0017229 A1 | | 8/2001 | Kada et al. |

* cited by examiner

Primary Examiner—Lesley D. Morris
Assistant Examiner—L. Lum
(74) Attorney, Agent, or Firm—Michael D. Smith

(57) ABSTRACT

A method and apparatus for controlling the feel back torque of a motor provides for receiving a difference between a desired motor position and an actual motor position; filtering the difference into two or more frequency bands; and applying a gain to one or more of the filtered frequency bands in correspondence with the received signal or a low-pass portion of the received signal to provide a motor command.

25 Claims, 6 Drawing Sheets

FEEL CONTROL FOR ACTIVE STEERING

BACKGROUND

Conventional vehicular steering systems have an articulated mechanical linkage connecting an input device (e.g., steering wheel or hand-wheel) to a steering actuator (e.g., steerable road wheel). Even with power assisted steering in an automobile, for example, a typical steering wheel motion directly corresponds to a resulting motion of the steerable road wheels with a fixed mapping.

With active steering, such as in an automotive front-controlled steering system, for example, a given motion of the steering wheel may be supplemented by the motion of a differential actuator, for example, to produce a motion of the steerable road wheels that need not correspond to the given motion of the steering wheel. When the differential actuator is inactive, the motion of the steerable road wheels directly corresponds to the steering wheel motion due to the articulated mechanical linkage, as in conventional systems. An operator of such an active steering vehicle can generally feel the forces acting against the steering actuator through the input device, as well as reaction forces typically induced by the actively controlled differential actuator.

SUMMARY

In an exemplary embodiment, a method and apparatus for controlling the feel back torque of a motor provides for receiving a difference between a desired motor position and an actual motor position; filtering the difference into two or more frequency bands; and applying a variable gain to one or more of the filtered frequency bands in correspondence with the received signal or a low-pass portion of the received signal to provide a motor command.

DETAILED DESCRIPTION

Figure 1:
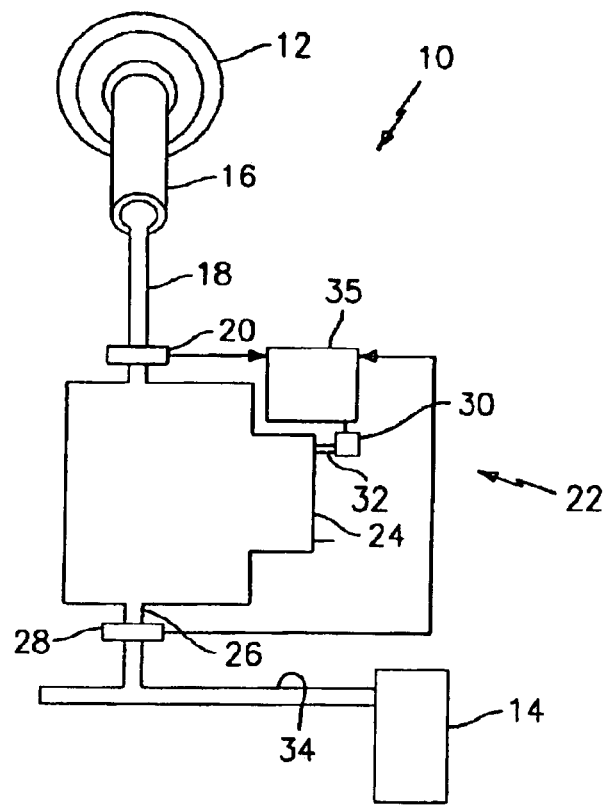
FIG. 1 shows a schematic representation of an active steering system.

As shown in FIG. 1, an active steering system for a vehicle is indicated generally by the reference numeral 10. The active steering system 10 includes an input device, specifically a hand-wheel 12 in this embodiment, in operable communication with a steering actuator, specifically a pair of road wheels 14 (only one shown) in this embodiment. The exemplary active steering system 10 may be referred to as a front-controlled steering ("FCS") system when employed to steer the front wheels of a road vehicle, as is currently preferred.

The hand-wheel 12 is connected to a steering hub 16, which is connected, in turn, to a first end of a steering input shaft 18. A hand-wheel position sensor 20 is disposed at the steering input shaft 18 for sensing the position of the hand-wheel 12. The steering input shaft 18 is connected at its second end to a differential actuator 22. It should be noted that although the steering system is described in context with a differential actuator, other types of actuator mechanisms are also applicable to the present embodiments. For example, a gearless linkage system (not shown) providing a similar angular augmentation may also be used.

The differential actuator 22 includes an actuator housing 24, which receives the steering input shaft 18 as its first input, and provides a steering output shaft 26. A motor 30 is connected to a motor shaft 32, which is received by the actuator housing 24 as its second input. A steering rack 34 is connected to the steering output shaft 26. A road-wheel position sensor 28 is disposed at the steering output shaft 26 for sensing the position of the road-wheels 14. A controller 35 is to signal communication between the hand-wheel position sensor 20, the road-wheel position sensor 28, and the motor 30. The active steering system 10 may further comprise an assist controller 36 in signal communication with the differential actuator 22. The controller 35 is also in signal communication with the assist controller 36 for adjusting a variable assist.

Figure 2:
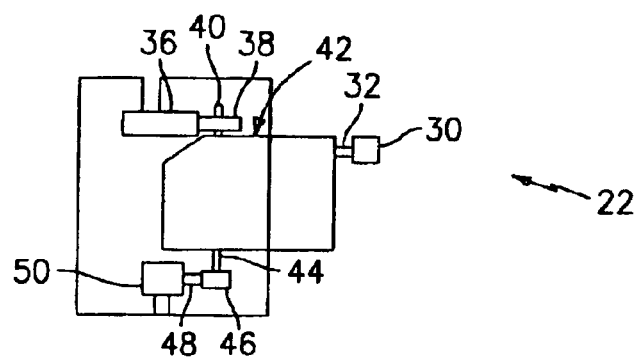
FIG. 2 shows a schematic representation of a differential actuator for use in an active steering system.

Turning to FIG. 2, the differential actuator 22 of FIG. 1 is shown in greater detail. The differential actuator 22 preferably includes a first gear 36 affixed to a lower end of the steering input shaft 18, and meshingly engaged with a second gear 38. The second gear 38 is affixed, in turn, to a differential input shaft 40, which enters an upper wall of a differential unit 42.

A differential output shaft 44 projects from a lower wall of the differential unit 42, and is connected at its lower end to a third gear 46. The third gear 46 is meshingly engaged with a fourth gear 48, which is meshingly engaged with a fifth gear 50. The motor shaft 32, which is connected to the motor 30, enters through a sidewall of the differential unit 42.

Figure 3:
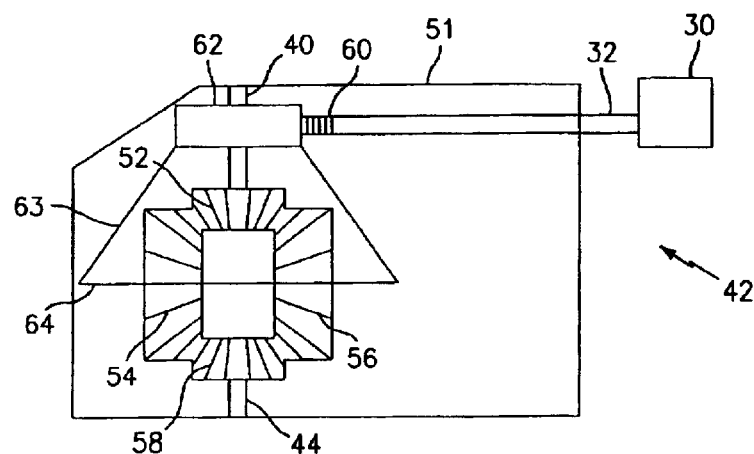
FIG. 3 shows a schematic representation of a differential assembly for use in a differential actuator.

With reference to FIG. 3, the differential unit 42 of FIG. 2 is shown in greater detail. The differential unit 42 comprises a differential housing 51. Within the housing 51, a lower end of the differential input shaft 40 is axially connected to an input gear 52. The input gear 52 is meshingly engaged with a first spur gear 54 and a second spur gear 56. The spur gears 54 and 56 are meshingly engaged with an output gear 58, which is connected to an upper end of the differential output shaft 44.

The motor shaft 32, which is connected to the motor 30, enters through a sidewall of the differential housing 51, and includes a worm drive 60 at its inner end. The worm drive 60 is meshingly engaged with a worm gear 62, which rotatably receives the differential input shaft 40 through its axial center. The differential input shaft 40 is free to rotate within the worm gear 62. The worm gear 62 fixedly supports a cage 63, which, in turn, fixedly supports a spindle 64, which spindle rotatably receives the spur gears 54 and 56 through their axial centers, respectively.

As will be recognized by those of ordinary skill in the pertinent art, alternate embodiments may add or substitute other suitable differential assemblies for the exemplary differential unit 42, such as, for example, a parallel-axis differential assembly having a differential carrier that comprises an input sun gear meshed with input differential planet gears, input differential planet gears meshed with output differential planet gears, and an output sun gear meshed with the output differential planet gears.

Figure 4:
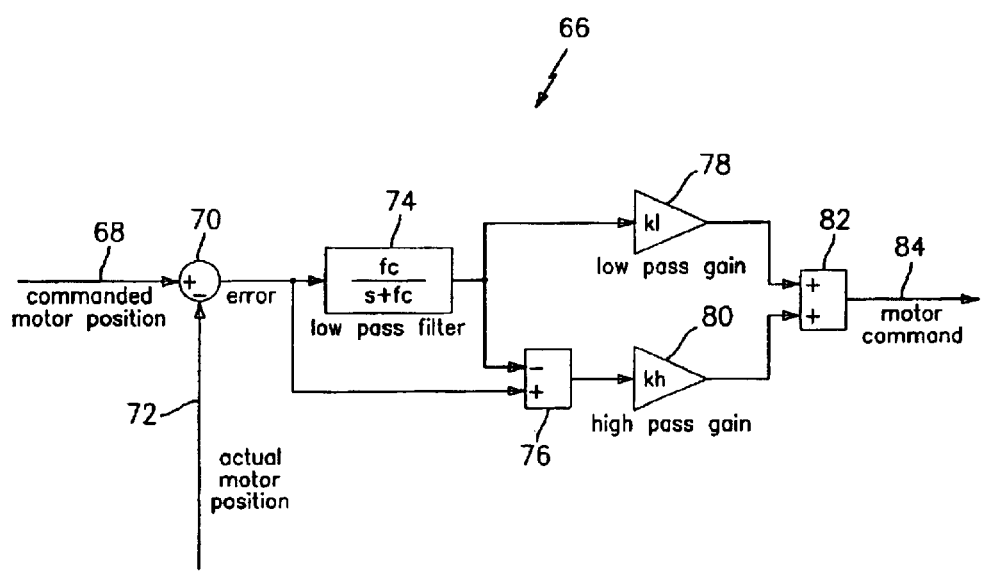
FIG. 4 shows a schematic representation of a feel control algorithm.

Turning now to FIG. 4, a feel control algorithm for use in an active steering system is indicated generally by the reference numeral 66. The feel control algorithm 66 receives a signal indicative of commanded motor position on input line 68, which is passed to a non-inverting input of a summing function 70. A signal indicative of actual motor position is received on input line 72, which is passed to an inverting input of the summing function 70.

The output of the summing function 70 is an error signal 73 that is passed to a low-pass filter 74, as well as to a non-inverting input of a summing function 76. The output of the low-pass filter 74 is passed to an inverting input of the summing function 76, as well as to a low-pass gain function 78. The output of summing function 76 is passed to a high-pass gain function 80, which passes its output to a non-inverting input of a summing function 82. The output of the low-pass gain function 78 is received at a second non-inverting input of the summing function 82. The output of the summing function 82 is passed to output line 84, and represents a signal indicative of a motor command to be applied to the motor 30 of FIGS. 1 through 3.

Figure 5:
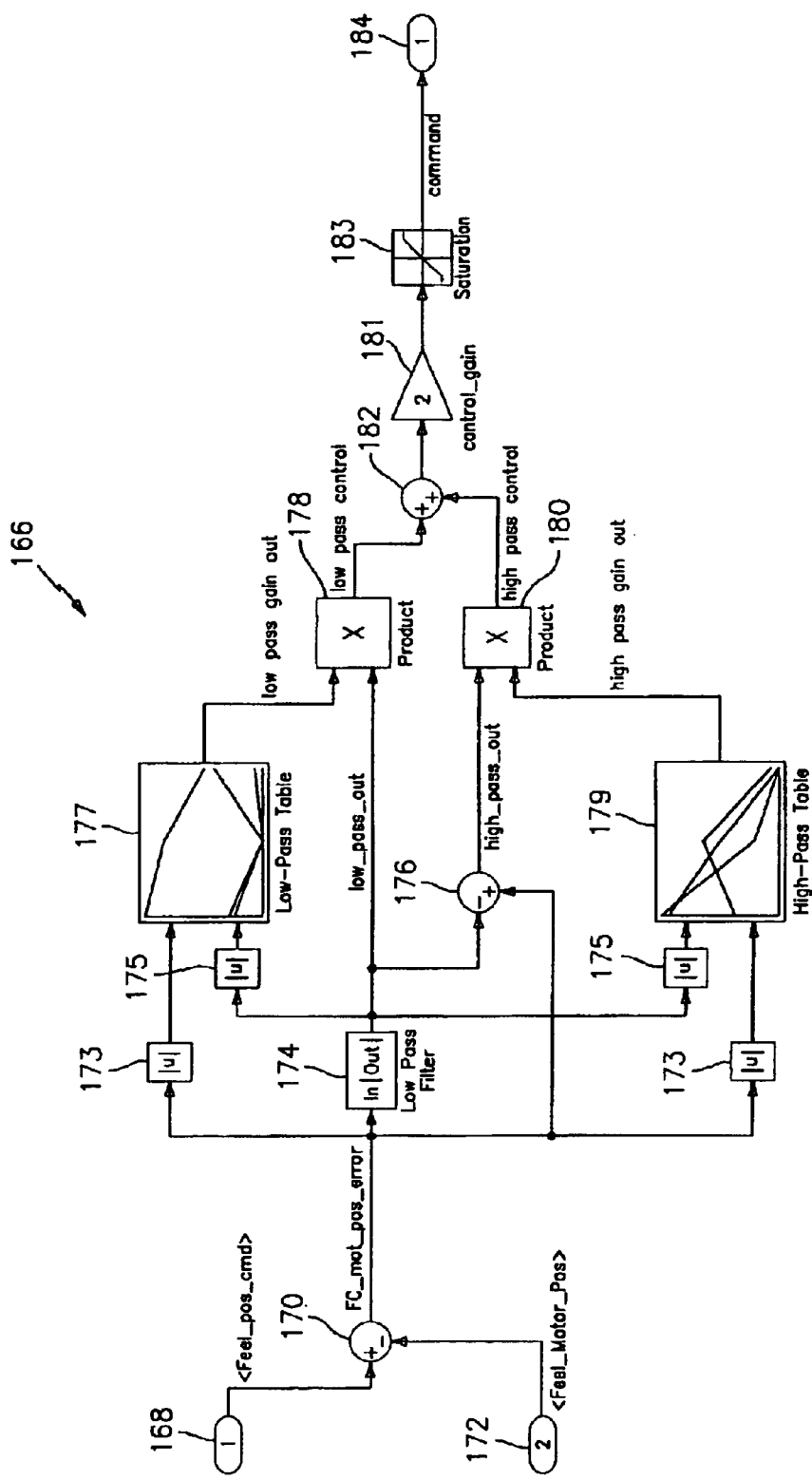
FIG. 5 shows a schematic representation of a preferred embodiment of the algorithm shown in FIG. 4.

Turning now to FIG. 5, preferred embodiment of a feel control algorithm for use in an active steering system is indicated generally by the reference numeral 166. The feel control algorithm 166 receives a signal indicative of commanded motor position at input terminal 168, which is passed to a non-inverting input of a summing function 170. The commanded motor position at input terminal 168 may be a function of variable steering ratio considerations, vehicle stability considerations, or a combination thereof. A signal indicative of actual motor position is received at input terminal 172, which is passed to an inverting input of the summing function 170.

The output of the summing function 170 is an error signal 171 that is passed to a low-pass filter 174, as well as to a non-inverting input of a summing function 176, and to an absolute value function 173. The output of the absolute value function 173 is passed to a first input of a low-pass gain look-up table 177, as well as to a first input of a high-pass gain look-up table 179. The output of the low-pass filter 174 is passed to an inverting input of the summing function 176, as well as to an absolute value function 175, and to a first input of a multiplication function 178. The output of the summing function 176 is passed to a first input of a multiplication function 180.

The output of the absolute value function 175 is passed to a second input of the low-pass gain look-up table 177, as well as to a second input of the high-pass gain look-up table 179. The output of the low-pass gain look-up table 177 is passed to a second input of the multiplication function 178, while the output of the high-pass gain look-up table 179 is passed to a second input of the multiplication function 180.

The output of the multiplication function 180 is passed to a first non-inverting input of a summing function 182. The output of the multiplication function 178 is received at a second non-inverting input of the summing function 182. The output of the summing function 182 is passed to a control gain function 181, the output of which is then passed, in turn, to a saturation function 183. The output of the saturation function 183 is passed to output terminal 184, and represents a signal indicative of a motor command to be applied to the motor 30 of FIGS. 1 through 3.

In operation of the active steering system 10 of FIG. 1, the steering position of the front road wheels is determined by the motor 30 in addition to the inputs received at the hand-wheel 12. That is, the position of the steerable road wheels is simply a scaled summation of the hand-wheel position (driver intent) and the motor position (actuation contribution). The motor position itself can be derived from various sources, including but not limited to such sources as vehicle and steering signals, in order to meet design criteria.

As the motor responds to its input command and attempts to move the road wheels to the intended position, a reaction torque, generally referred to as "feel back torque", is generated by the differential actuator 22 and is felt by the driver through the hand-wheel 12. The feel control algorithms of FIGS. 4 and 5 reduce the objectionable components of the feel back torque by responding differently to different input signal frequency components.

Although certain frequency components of the feel back torque may be generally undesirable, it is preferable that some feel back torque be resisted at the hand-wheel. For example, if the driver were to avoid this torque by removing his or her hands from the steering wheel, the road wheels might take longer to achieve their intended position and only a fugal motion of the steering wheel might take place. Accordingly, the feel control algorithms of FIGS. 4 and 5 do not eliminate the feel back torque to the driver, but control it by transforming the frequency, duration, amplitude and/or transient characteristics of the feel back torque.

The feel control algorithms 66 of FIG. 4 and 166 of FIG. 5 may be employed as an integral part of an active steering or front controlled steering (FCS) system. The feel control algorithm 66, for example, begins by taking the difference or error between the commanded and actual motor position signals at summing function 70. Without a feel control algorithm, this error would have typically been scaled up or down to form a final motor command. The higher the scaling, the sooner the motor servos the error and achieves its commanded position. With the driver holding rigidly, however, this higher scaling would have caused the transient "feel back" sensations felt by the driver to have increased.

With the feel control algorithm, the comparable error signal is divided into two paths: a high frequency path, and a low frequency path. Each path is scaled with a corresponding gain $K_l$ and $K_h$, respectively, either of which may be constant in some embodiments. The two paths are then summed to form a modified motor command signal, which then moves the motor 30 accordingly. Although this exemplary embodiment uses two paths, any multiple of paths may be used in alternate embodiments wherein each path may include a different filter.

The transfer function between the error signal and the modified motor position command is indicated by Equation 1:

$$F(s)=(K_h{}^*s+K_l{}^*f_c)/(s+f_c) \qquad (1)$$

where $f_c$, is the cut-off frequency for the low-pass filter 74.

The transfer function of Equation 1 reduces to unity, that is F(s)=1, when $K_h=K_l=1$, which effectively bypasses the algorithm. The transfer function simplifies to a low-pass filter when $K_h=0$ and $K_l$ has any nonzero value; and simplifies to a high-pass filter when $K_l=0$ and $K_h$ has any nonzero value. A pure low-pass filter would slow down the response of the FCS system by filtering out high frequencies in the error signal. A pure high-pass filter would speed up the response, but would be unresponsive to a steady error signal. The feel control algorithm is structured such that it responds differently to different kinds of input error transients. Testing indicates that drivers tolerate high-frequency transients differently than low-frequency transients.

Figure 6:
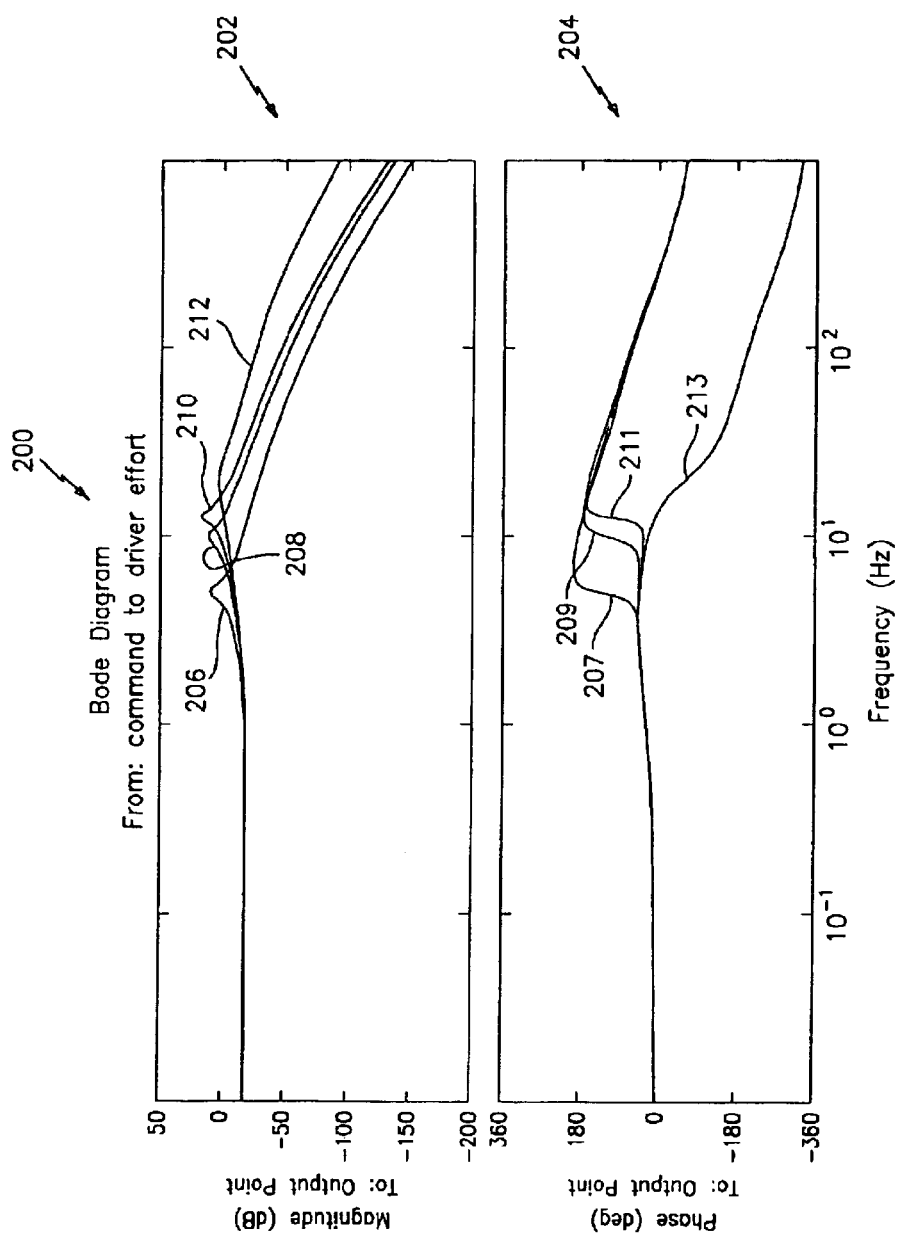
FIG. 6 shows a Bode diagram for a low-pass mode of a feel control algorithm.

As shown in FIG. 6, a low-pass frequency response plot of a FCS system 10 is indicated generally by the reference numeral 200. For this plot, the complex vehicle dynamics were simplified to a compliance. Accordingly, the steering rack 34 of FIG. 1 was attached to linear springs, rather than road wheels, that were designed to represent vehicle loads at various conditions (e.g., highway). The steering wheel was held rigidly at center. Accordingly, the frequency response plot 200 shows the highest possible feel back torques to the driver. The plot 200 includes a magnitude plot 202, and a phase plot 204. The plotted output represents the hand-wheel torque.

Unless otherwise specified, the traces were obtained with $K_l=1$ and $K_h=0$. A first magnitude trace 206 corresponds to a cut-off frequency for the low-pass filter 74 of FIG. 4 of $f_c=1$ Hz. A corresponding phase trace 207 indicates the phase angle for $f_c=1$ Hz. A second magnitude trace 208 corresponds to a cut-off frequency for the low-pass filter 74 of $f_c=5$ Hz. A corresponding phase trace 209 indicates the phase angle for $f_c=5$ Hz. A third magnitude trace 210 corresponds to a cut-off frequency for the low-pass filter 74 of $f_c=10$ Hz. A corresponding phase trace 211 indicates the phase angle for $f_c=10$ Hz. A fourth magnitude trace 212 corresponds to $K_l=K_h=1$ for the low-pass filter 74, and a corresponding phase trace 213 indicates the phase angle for $K_l=K_h=1$.

With a small high-frequency gain, as the cut-off frequency, $f_c$, is lowered, the magnitude plot shows that the driver will notice less of the feel back torques at higher frequencies. This corresponds to the servo system being less responsive to high frequency inputs. A mode is generated, however, at 5 to 12 Hz as a side effect. The phase plot reveals that the system stability is marginal at the chosen loop gains. This is explained as a pure low-pass system ($K_h=0$) in the loop, which tends to destabilize the system.

Figure 7:
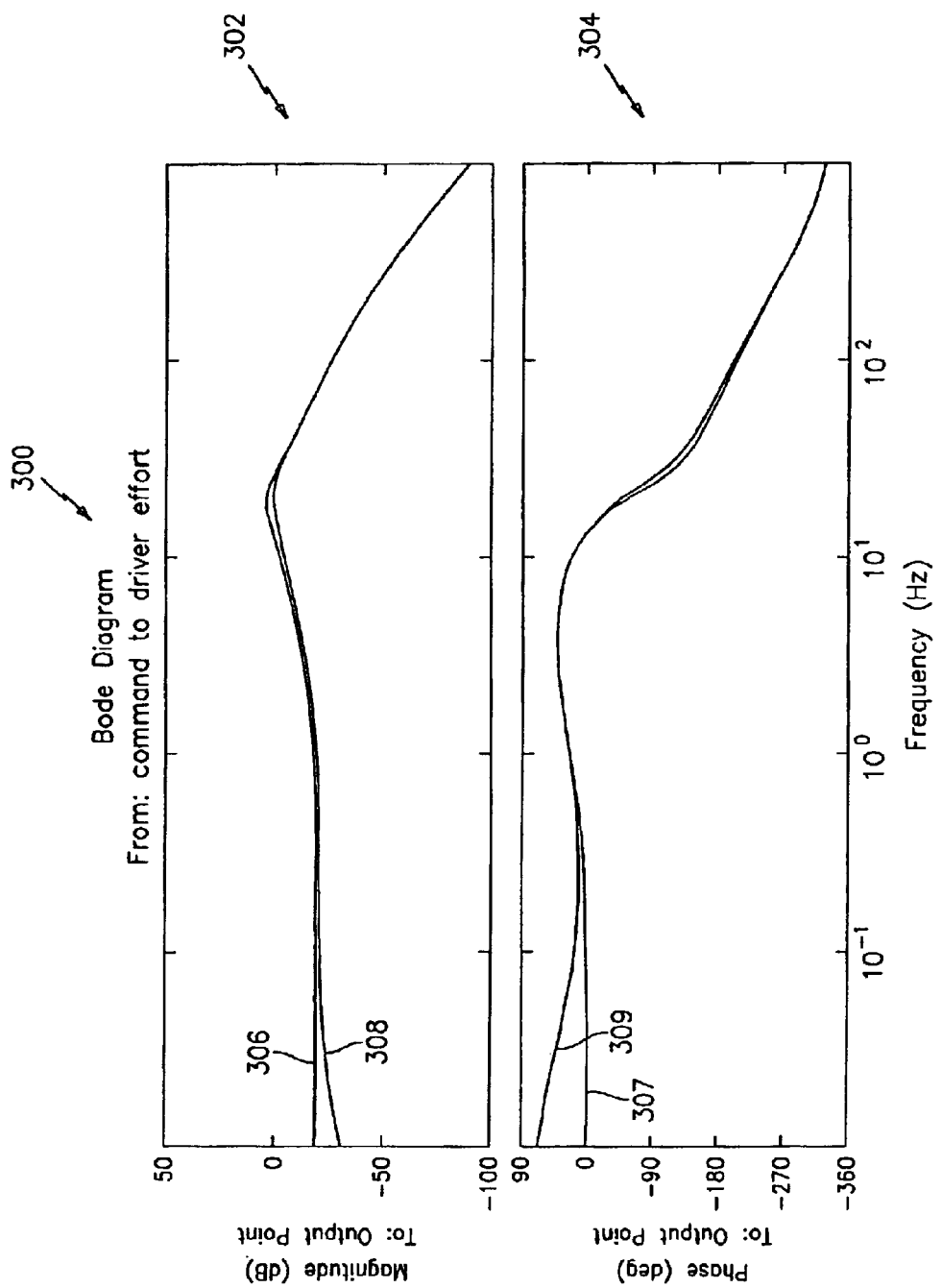
FIG. 7 shows a Bode diagram for a high-pass mode of a feel control algorithm.

Turning to FIG. 7, a high-pass frequency response plot of a FCS system 10 is indicated generally by the reference numeral 300. For this plot as well, the complex vehicle dynamics were simplified to a compliance. Accordingly, the steering rack 34 of FIG. 1 was attached to linear springs, rather than road wheels, that were designed to represent vehicle loads for various conditions (e.g., highway). The steering wheel was held rigidly at center. The frequency response plot 300, therefore, shows the highest possible feel back torques to the driver for a high-pass system with $K_l=0$.

A base-line magnitude trace 306 corresponds to $K_l=K_h=1$ for the low-pass filter 74 of FIG. 4, and the corresponding phase trace 307 indicates the phase angle for $K_l=K_h=1$. A high-pass magnitude trace 308 corresponds to $K_l=0$, $K_h=1$, and $f_c=5$ for the low-pass filter 74 of FIG. 4, and the corresponding phase trace 309 indicates the phase angle for $K_l=0$, $K_h=1$, and $f_c=5$. Although a first order filter is shown in this exemplary embodiment, higher order filters may be used in alternate embodiments in order to meet design criteria.

The results of FIGS. 6 and 7 indicate that a balance is preferably struck between stability, feel back control, and achieving design criteria related to the vehicle-level benefits of an FCS system. As the high-pass action is added, the system becomes more stable, but the driver will feel more of the high frequency inputs, as shown in FIG. 7. A balance is struck by scheduling the gains $K_l$, and $K_h$. Testing indicates that a driver is more tolerant of a larger pulse-like feel-back torque if its duration is short.

Accordingly, the preferred embodiment of FIG. 5 is provided to allow for both $K_l$ and $K_h$ gains to be adjusted as a function of the magnitude of the error signal. For $K_h$, the gain goes down as the magnitude of the error signal is increased in order to shield the driver from harsh or high-magnitude feel back torques. The same or comparable method may be used for $K_l$. In order to meet design criteria, the tables and gains for the feel control algorithm 166 of FIG. 5 are preferably tuned in accordance with in-vehicle testing of $f_c$, and the $K_l$ and $K_h$ tables.

As shown with reference to FIG. 5, non-linear tables for $K_l$ and $K_h$ are indexed on both (or alternatively, either) the error signal and/or the low-pass portion of the error signal. Absolute value functions 173 and 175 are used for processing efficiency. The saturation function 183 is used to limit the final output command or control signal. The low-pass filter 174 may take any of a variety of forms, and is not limited to a first-order filter in alternate embodiments. These tables may also be indexed by other parameters, such as, for examples, vehicle state estimates, environment estimates, and driver preferences.

Figure 8:
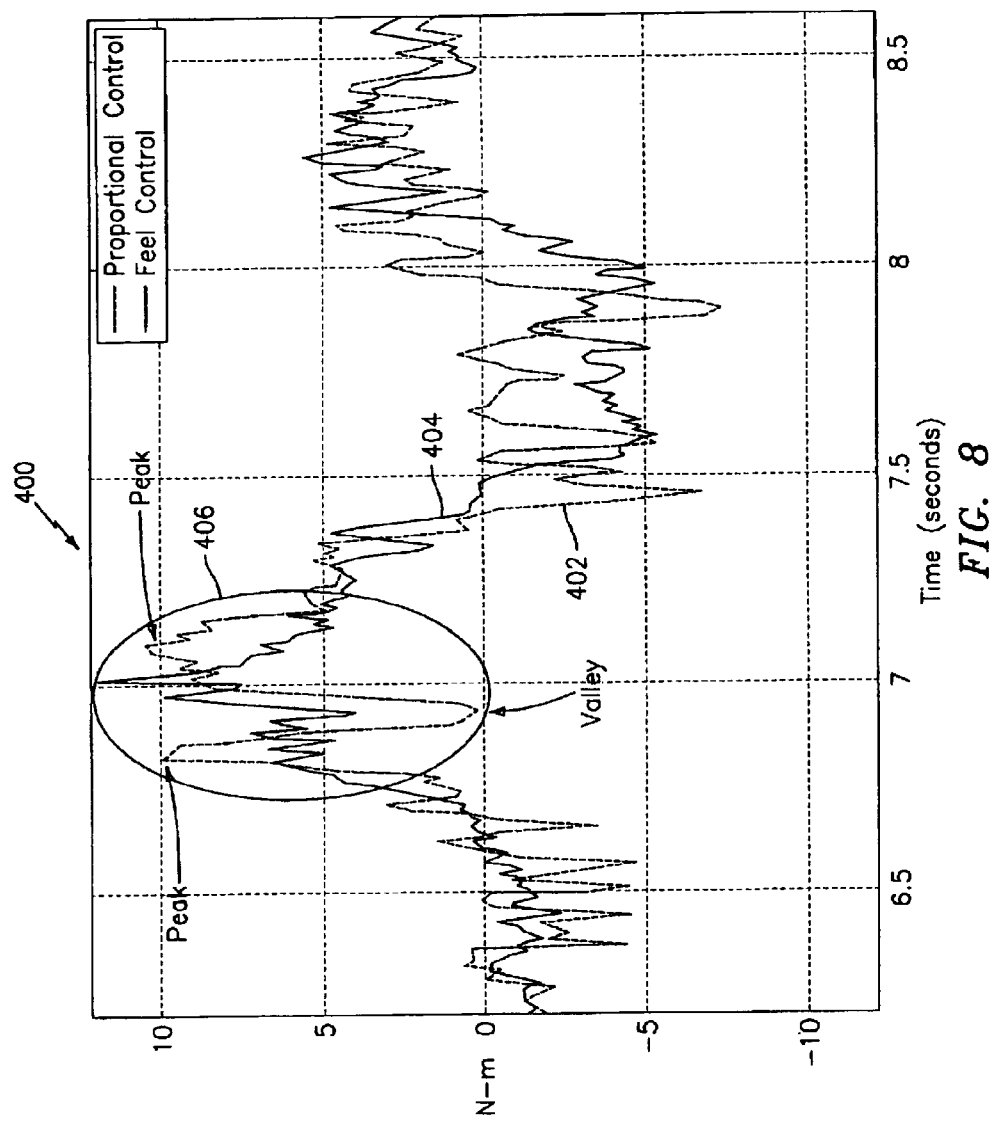
FIG. 8 shows a comparative plot of hand-wheel torques with and without a feel control algorithm.

FIG. 8 shows a time-wise plot of hand-wheel torque, indicated generally by the reference numeral 400. The plot 400 shows a signal trace 402 of the hand-wheel torque using a conventional proportional-only control, and a signal trace 404 of the hand-wheel torque using the feel control algorithm described above with respect to FIG. 5. These plots are the result of running tests for a single lane change on a packed-snow surface at roughly 40 MPH. The plots show the reduction in the high-frequency component of torque variations for the feel control algorithm.

In particular, the peak-valley-peak as shown in the circled region 406 is greatly reduced using a feel control algorithm as described above. This peak-valley-peak transient is objectionable due to its low-frequency content. Even though the absolute magnitude of the peak produced by the feel control algorithm may be higher than for proportional controllers, it is much less objectionable to a driver due to its short duration and high frequency.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof.

For example, the present teachings may be applied to general control algorithms wherein the actuation is preferably smoothed to optimize the man-machine interface. Such control algorithms may include, but are not limited to, input devices such as pedals and actuators such as linear motors, and more generally, any controlled device in contact with human skin. It is understood that such control algorithms are applicable to lane keeping systems and steer by wire systems, in addition to hand-wheel actuation in a front controlled steering application. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a feel back torque of a motor, the method comprising:

receiving a signal indicative of a difference between a desired motor position and an actual motor position;

filtering the received signal into a plurality of frequency bands; and applying a gain to at least one of the filtered frequency bands in correspondence with at least one of the received signal and a low-pass portion of the received signal to provide a motor command.

2. A method as defined in claim 1 wherein the motor is disposed relative to a differential.

3. A method as defined in claim 2 wherein the motor and differential are comprised by an active steering system.

4. A method as defined in claim 1 wherein said gain is variable.

5. A method as defined in claim 1 wherein, said gain is scheduled.

6. A controller for an active steering system, the controller comprising:

a feel control algorithm for controlling a feel back torque to a driver, said feel control algorithm comprising a filter, and at least one of a high-pass gain and a low-pass gain;

wherein said at least one of said high-pass gain and said low-pass gain operate on a high pass portion of an error signal and a low-pass portion of the error signal.

7. A controller as defined in claim 6 wherein the at least one of the high-pass gain and a low-pass gain comprise a scheduling table indexed on the at least one of the error signal and the low-pass portion of the error signal.

8. A controller as defined in claim 7 wherein said scheduling table is further indexed on at least one of a vehicle state estimate, an environment estimate, and a driver preference.

9. A controller as defined in claim 6 wherein at least one of the high-pass gain and the low-pass gain is a non-linear function of the at least one of the error signal and the low-pass portion of the error signal.

10. A controller as defined in claim 6 further comprising at least one absolute value function in signal communication with the at least one of the high-pass gain and the low-pass gain.

11. A controller as defined in claim 6 further comprising a final output saturation check function in signal communication with the at least one of the high-pass gain and the low-pass gain.

12. A controller as defined in claim 6 wherein said filter is a first-order filter.

13. A controller for an active steering system, the controller comprising:

means for receiving a signal indicative of a difference between a desired motor position and an actual motor position;

means for filtering the received signal into a plurality of frequency bands; and means for applying a gain to at least one of the filtered frequency bands in correspondence with at least one of the received signal and a low-pass portion of the received signal to provide a motor command.

14. A method for actively controlling the steering of a motor vehicle, the method comprising:

receiving an operator input from an operator of the motor vehicle;

receiving a stability input indicative of a dynamic stability of the motor vehicle;

calculating a correction signal in accordance with the operator input and the stability input;

filtering the connection signal into a plurality of frequency bands;

applying a gain to at least one of the filtered bands to produce an output signal corresponding to a desired feel back torque; and adjusting an input to a differential actuator in accordance with the output signal.

15. A method as defined in claim 14 wherein said adjusting comprises:

providing the output signal to an electric motor disposed relative to the differential actuator in order to adjust a steering angle of a steering actuator while maintaining desirable feel back torque characteristics.

16. An active steering system comprising:

an input device;

a differential actuator in operable communication with said input device;

a steering actuator in operable communication with said differential actuator; and a feel controller in signal communication with said input device, said steering actuator, and said differential actuator for controlling a feel back torque to an operator, said feel controller includes a low-pass filter for dividing a signal into a low-frequency component and a high-frequency component.

17. An active steering system as defined in claim 16, the differential actuator comprising:

a motor in signal communication with said feel controller; and a differential unit disposed relative to said motor, said input device, and said steering actuator.

18. An active steering system as defined in claim 17 wherein said differential unit is configured to provide a steering angle to said steering actuator that is substantially independent of an input from an operator.

19. An active steering system as defined in claim 17 wherein said differential unit further comprises:

an input gear axially affixed to a differential input shaft;

an output gear axially affixed to a differential output shaft;

a first spur gear meshingly engaged with said input gear and said output gear;

a second spur gear meshingly engaged with said input gear and said output gear; and a worm drive meshingly engaged with a worm gear; said worm gear rotatingly receiving said differential input shaft therethrough.

20. An active steering system as defined in claim 19 wherein said worm drive is disposed at an end of a motor shaft, said motor shaft being coupled to said motor.

21. An active steering system as defined in claim 16 wherein said feel controller comprises a high-pass gain function and a low-pass gain function.

22. An active steering system as defined in claim 16 wherein said feel controller further comprises a summing function for receiving an input of the low-pass filter and an output of the low-pass filter, and for providing an input to a high-pass gain function.

23. An active steering system comprising:

means far receiving a steering input from an operator of the motor vehicle;

means far receiving a stability input indicative of a dynamic stability of the motor vehicle;

means for calculating a correction signal in accordance with the steering input and the stability input;

means for filtering the correction signal into a plurality of frequency bands;

means for applying a gain to at Least one of the filtered bands to produce an output signal corresponding to a desired feel back torque; and means for adjusting an input to a differential actuator in accordance with the output signal.

24. A motor controller, comprising:

a feel control algorithm for controlling a feel back torque to an operator, said feel control algorithm comprising a filter, and at least one of a high-pass gain and a low-pass gain;

wherein said at least one of said high-pass gain and said low-pass gain operate on a high pass portion of an error signal and a low-pass portion of the error signal.

25. A controller as defined in claim 6 wherein said error signal is indicative of a difference between a desired motor position and an actual motor position.

* * * * *